United States Patent [19]
Goldberg

[11] 3,897,887
[45] Aug. 5, 1975

[54] REMOTELY CONTROLLING AND METERING LIQUID DISPENSATION

[75] Inventor: Michael Goldberg, Worcester, Mass.

[73] Assignee: Banyon Research Corporation, Worcester, Mass.

[22] Filed: Sept. 4, 1973

[21] Appl. No.: 394,066

[52] U.S. Cl. .................. 222/26; 222/32; 340/151
[51] Int. Cl.² .......................................... B67D 5/26
[58] Field of Search ................ 222/1, 2, 25–28, 222/32–38, 23; 340/150, 152, 151, 310, 171, 203, 147 SY; 194/13; 235/151.34

[56] References Cited
UNITED STATES PATENTS

| | | | |
|---|---|---|---|
| 3,236,415 | 2/1966 | Parker | 222/35 X |
| 3,392,378 | 7/1968 | Perry | 340/150 X |
| 3,445,814 | 5/1969 | Spalti | 340/150 X |
| 3,448,895 | 6/1969 | Mesh | 222/34 X |
| 3,498,501 | 3/1970 | Robbins et al. | 222/35 X |
| 3,593,883 | 7/1971 | Robbins | 222/35 X |
| 3,641,536 | 2/1972 | Prosprich | 222/23 X |
| 3,705,385 | 12/1972 | Batz | 340/152 R |

*Primary Examiner*—Robert B. Reeves
*Assistant Examiner*—Joseph J. Rolla
*Attorney, Agent, or Firm*—Charles Hieken; Jerry Cohen

[57] ABSTRACT

A system for remotely controlling and metering gasoline dispensation includes a self-contained master console to be installed at a remote location and a package to be installed inside each controlled and metered pump with control and metering signals exchanged over the power lines on two tone-modulated carriers being an A channel for carrying volume and cost data signals from the pumps to the master console, and a B channel for carrying command signals from the master console to cause the designated pump to transmit volume and cost signals, and to cause power to be applied to the selected pump motor, and for carrying intercom control signals from the master console. Separate digital counters triggered by a pulser mounted on the mechanical computer inside the gasoline pump accumulate volume and cost data signals which are transmitted upon command to a shift register and then to the remote location. A logic circuit prevents simultaneous data transmission from controlled pumps.

6 Claims, 5 Drawing Figures 3,897,887

REMOTELY CONTROLLING AND METERING LIQUID DISPENSATION

BACKGROUND OF THE INVENTION

The present invention relates in general to remotely controlling and metering liquid dispensation and more particularly concerns novel apparatus and techniques for remotely controlling and metering dispensation of gasoline or other fuel in a self-service station in a manner which reliably controls a number of pumps with relatively few personnel with apparatus that is relatively easy and inexpensive to install.

One approach to reducing gasoline costs is self-service. A customer drives up to a pump, asks through an intercom for authority to dispense fuel, an operator in the station office operates a switch that activates the pump, the customer operates the hose valve to fill his tank and then goes to the office to pay the attendant an amount indicated both on the gasoline pump and a monitor in the office. A serious problem with such systems is the expense and disruption associated with installing a self-service system in an existing service station. Costly time-consuming excavations are normally required to run wires between the station office and the self-service pumps.

Accordingly, it is an important object of this invention to control and meter liquid dispensation while overcoming one or more of the disadvantages set forth above.

It is an important object of the invention to provide an improved remote control system for use in a self-service station.

It is a further object of the invention to provide a system in accordance with one or more of the preceding objects which is relatively easy and inexpensive to install without disrupting station operations.

It is a further object of the invention to achieve one or more of the preceding objects with reliable control and metering apparatus suitable for use with a number of pumps under the control of a single attendant.

SUMMARY OF THE INVENTION

According to the invention, there is a central location for controlling and metering liquid dispensation from at least one remote location, and means including sources of modulated carriers at the central and remote locations carried by the power lines intercoupling the central and remote locations. Preferably, there are means defining a first channel on said carriers for transmitting digital data signals representative of the liquid quantity dispensed from the remote location to the central location, means defining a second channel for transmitting command signals from the central location to the remote location to initiate transmission of liquid dispensation data signals from the remote location to the central location, and controlling the dispensation of liquid at the remote location and for establishing a predetermined initial condition of the liquid dispensation data. In a preferred form of the invention there are means for carrying a data signal from the remote location to the central location indicative of the state of liquid dispensation.

Numerous other features, objects and advantages of the invention will become apparent from the following specification when read in connection with the accompanying drawing in which:

DETAILED DESCRIPTION OF PREFERRED EMBODIMENTS

Figure 1:
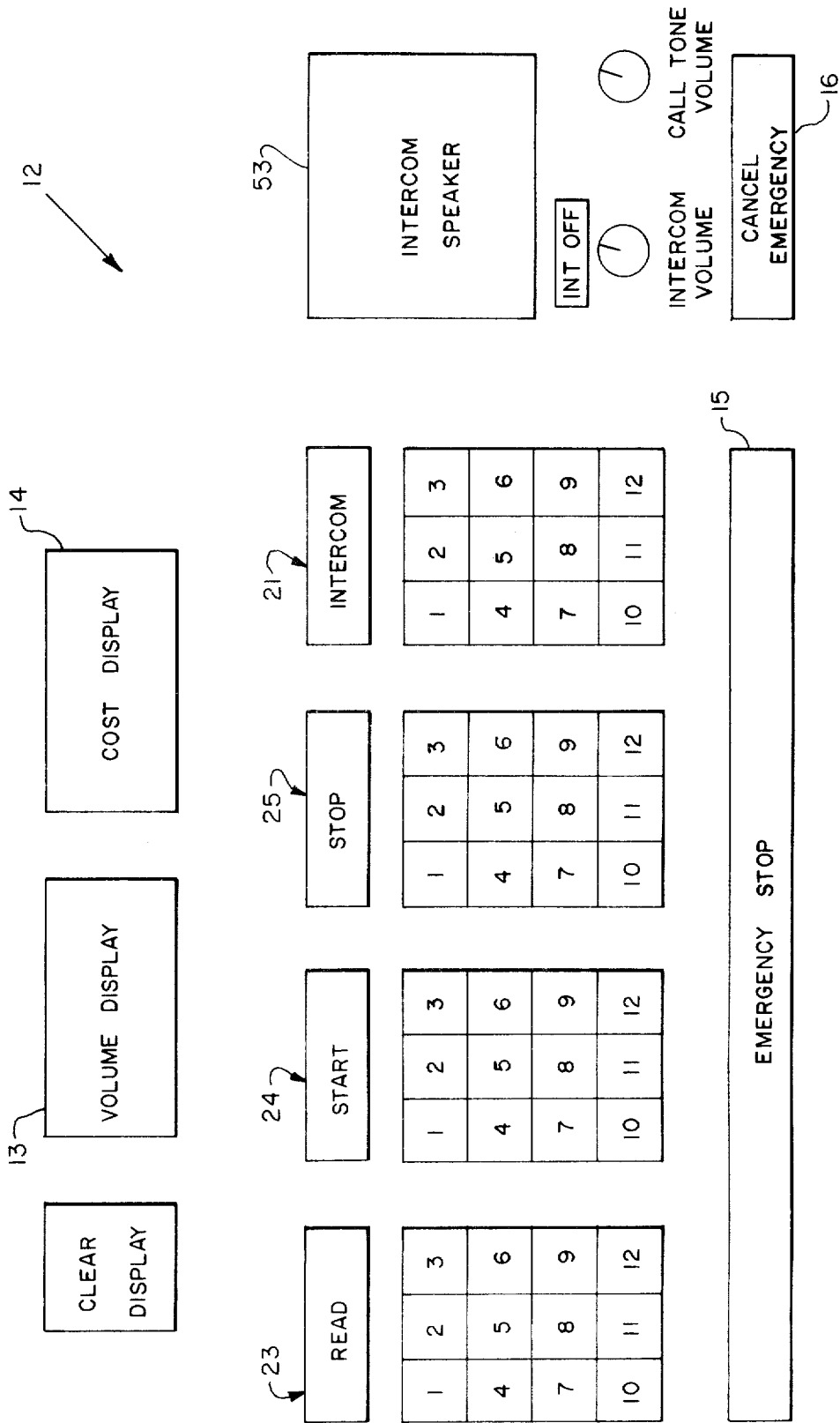
FIG. 1 show a section of the master console control panel.

With reference now to the drawing and more particularly FIG. 1 thereof, there is shown a view of the master console control panel helpful in understanding operation of the system. The specific embodiment described herein includes the means for controlling and monitoring 12 self-service pumps. There is a group of each control keys associated with eacha control function. Each contains a separate key for each controlled pump so that the attendant at the central location may control and monitor all the pumps with the volume dispensed and cost thereof associated with a particular pump being displayed in volume display 13 and cost display 14.

Keyboard 12 includes an emergency stop key 15 for preventing all pumps from operating when depressed without losing the count or cost. The system may be restored to normal operation by depressing cancel emergency key 16.

Keyboard 12 also includes a group 21 of intercom keys for enabling voice communication with a pump, a group 23 of read keys for causing the selected pump to display the volume dispensed and cost thereof in displays 13 and 14, a group 24 of start keys for enabling a pump and a group 25 of stop keys for disabling pump.

If a button is pressed, it remains lit until its function is cancelled, either automatically or by the operator. E.g., a start button remains lit until the nozzle is replaced or a stop button pressed. If the nozzle is replaced, the read key blinks until pressed -- if STOP is pressed, it lights up.

Figure 2:
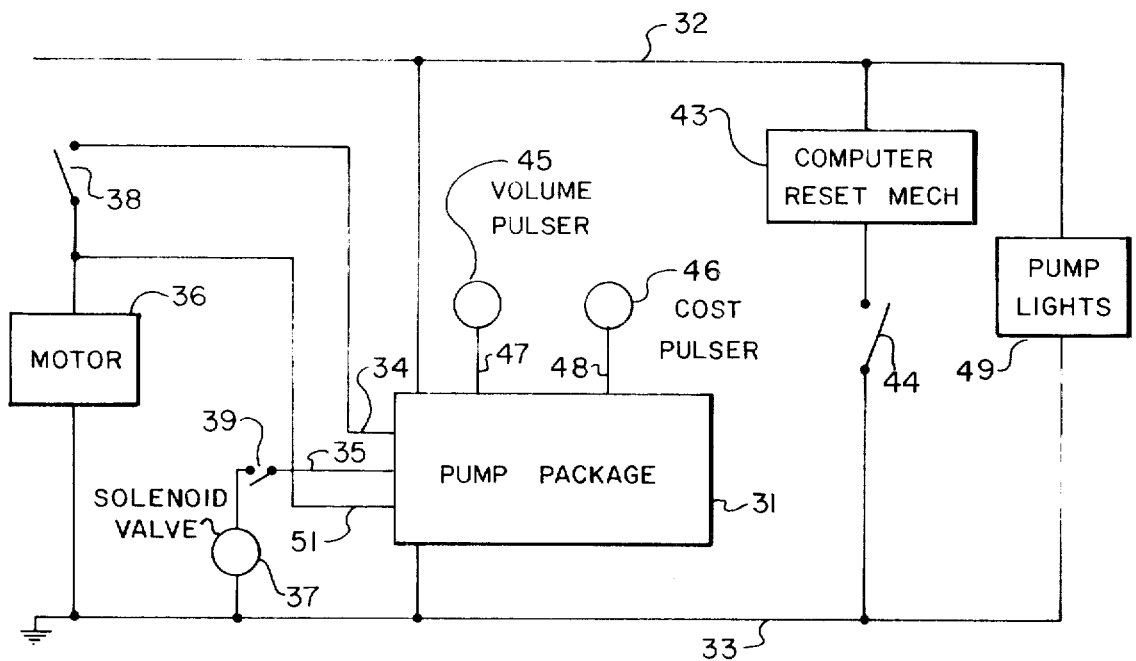
FIG. 2 is a combined block-schematic diagram illustrating the logical arrangement of the remote station at the pump.

Referring to FIG. 2, there is shown a block diagram illustrating the logical arrangement of a remote pump location according to the invention. The system pump package 31 according to the invention installed at each pump receives 110 volt a-c from power lines 32 and 33 and includes lines 34 and 35 for delivering energy to pump motor 36 and/or solenoid valve 37, respectively, through pump mounted switches 38 and 39, respectively, attached to the pump and closed when the nozzle is removed from the cradle.

Pumps with automatic reset typically operate as follows. A single on-off control lever is positioned to prevent the nozzle from being cradled with the lever in the ON position. When the lever is moved to the ON position, a mechanical linkage first closes switch 34 to energize computer reset mechanism 43 and return the volume and cost computers to zero and then opens switch 44 while closing switches 38 and 39. Many pumps have motor 36 and solenoidal valve 37 in parallel both energized from line 34 through switch 38.

A volume pulser 45 and cost pulser 46 are attached to the volume and cost output shafts, respectively, on the pump computer, for providing a pulse from the former in response to each 0.1 gallon dispensed and from the latter in response to each cent of cost accumulated. These pulses are delivered to system pump package 31 over lines 47 and 48, respectively. System pump package 31 also receives a signal over line 51 for indicating when switch 38 closes which causes the counters to reset to zero. Pump lights 49 are connected between a-c lines 32 and 33, or between line 33 and a separate hot line switched from the building.

Figure 3:
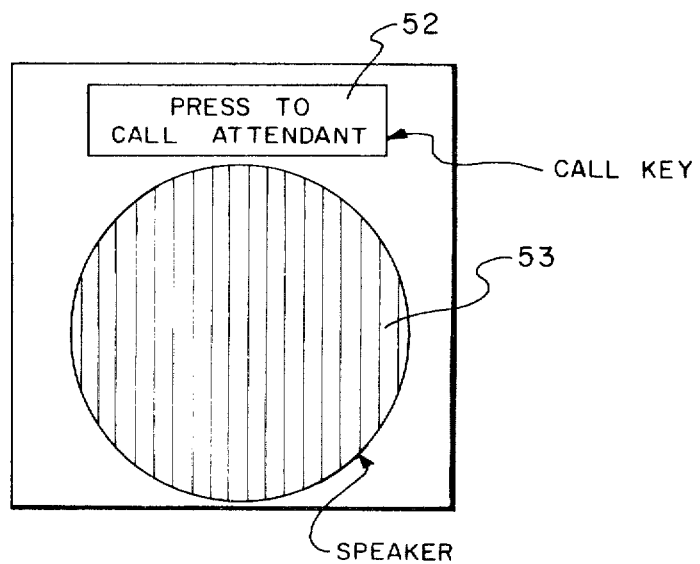
FIG. 3 is a front view of a package for installation on top of the pump.

Referring to FIG. 3, there is shown a front view of a typical pump installation which may be installed on a light pole on the island or above a pump. This unit includes a press to call attendant switch 52 and an intercom speaker 53.

Before discussing specific apparatus that effects the desired control and metering, it is appropriate to consider a typical transaction. A customer drives to a pump, presses call key 52 and requests authorization or instructions from the attendant through speaker 53. The attendant then opens the intercom channel by pressing the appropriate intercom button 21 and instructs the customer. The attendant then enables the sale by touching the appropriate start key 22 to make power available on lines 34 and 35. The customer then removes the nozzle from the cradle and throws the control lever, causing the mechanical computer to reset by, for example, closing switch 44 to energize reset mechanism 43 and closing switch 38, applying power to pump motor 36, and providing a signal on line 51 that resets the counters. When the customer is finished, he returns the nozzle to the cradle, opening switch 38, and proceeds to the central location to pay the attendant. That pump will remain inactive until a start key is again pressed. The attendant then presses a read key 23 to cause the volume and grade of fuel to appear on display 13 and the cost of the gasoline dispensed on display 14.

If for any reason, such as a customer smoking, the attendant wishes to stop a delivery, he may press a stop key 25. He can thereafter restart the pump without losing data for the completed portion of the sale by pressing an appropriate start key 24.

If the attendant restarts the delivery, the mechanical computer at the pump (and the pump storage register) will continue counting from the value at which it previously stopped.

Emergency stop key 15 has the same effect as pressing all the stop keys 25 simultaneously. When emergency stop key 15 is pressed, all product flow stops. The apparatus is arranged so that removal of the console power cord from the wall outlet has the same effect as pressing emergency stop key 15.

The cancel emergency key 16 has the same effect as pressing all the start keys 24 simultaneously. The pumps that were in use resume delivery. If the console power cord is removed from the wall outlet, replacing it has the same effect as pressing the cancel emergency key 16. The intercom is controlled by the intercom keys 21.

Figure 4:
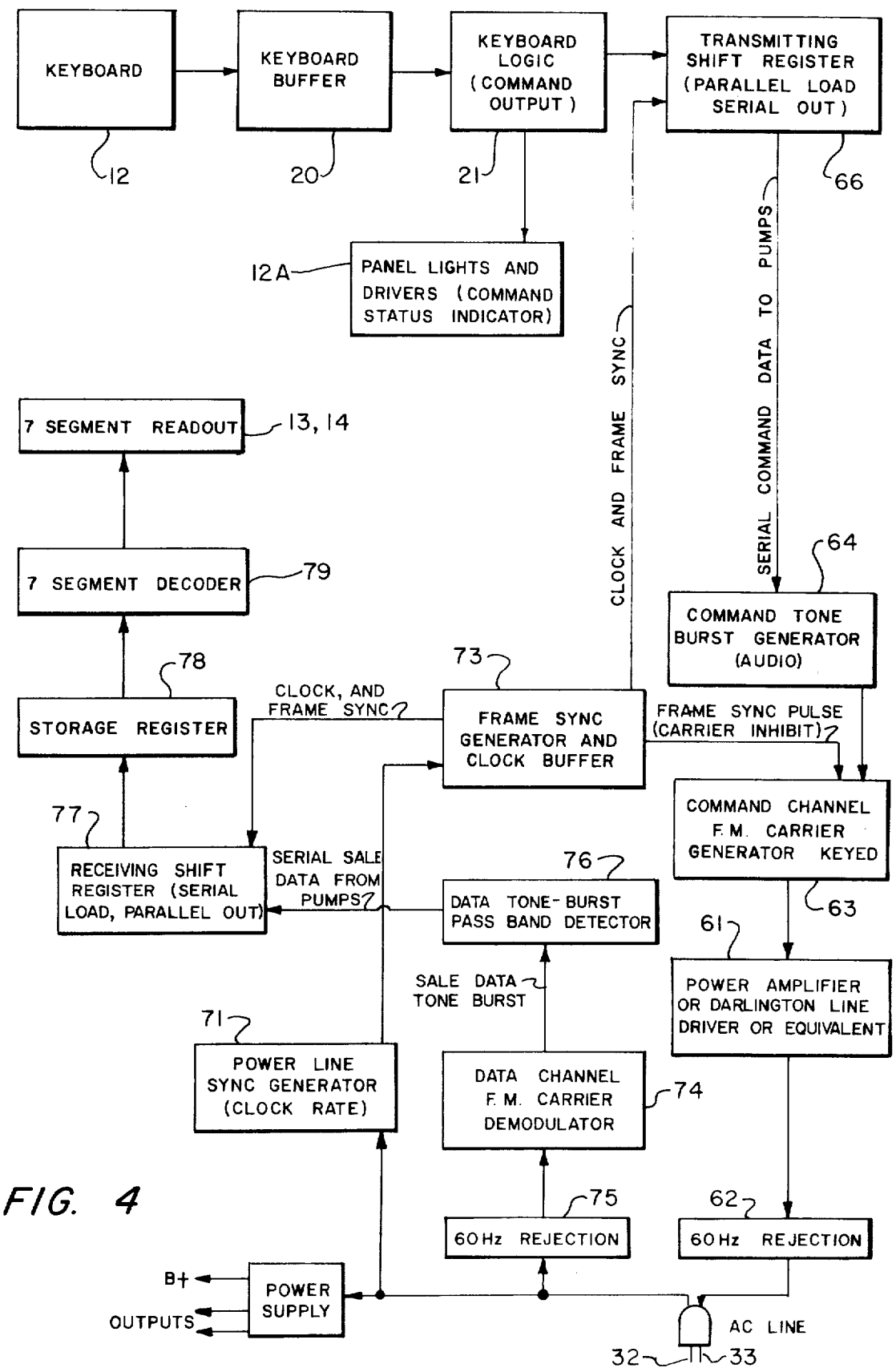
FIG. 4 is a block diagram illustrating the logical arrangement of a wireless fuel pump controller at the remote pump unit.

Referring now to FIG. 4, there is shown a block diagram illustrating the logical arrangement of a central location system according to the invention. All data is transmitted over the power lines 33 and 32 on a low radio frequency carrier modulated by an audio tone in this example. The transmitting portion includes a line driver 61 coupled to the output line by means including a 60 Hz rejection filter 62. Carrier generator 63 provides a carrier signal typically of 50 kHz (channel A) and is modulated with a 1 kHz tone provided by oscillator 64. Oscillator 64 is gated on and off in accordance with a digital signal transmitted by 40-bit multiplexer 66 representative of actuation of read, start and stop keys 22, 23 and 24, respectively, of keyboard 12 in response to signals from keyboard buffer 20 and keyboard logic 21, the latter controlling panel lights and drivers 12A in synchronism with signals provided by power line sync generator 71. Emergency shutoff and cancel emergency keys 15 and 16 control carrier generator 63. The specific circuitry for effecting the digital modulation of the tones in accordance with keyboard selections is well-known in the art and not a part of the invention. Accordingly, details of the circuitry are omitted to avoid obscuring the principles of the invention. Counting circuitry in frame sync generator and clock buffer 73 counts clock pulses and every 40th clock pulse produces a frame sync pulse to cause the carrier to be gated off for an interval about one tenth of the width of a command data pulse. Every 40 clock pulses or bits, is one frame.

The central station receiver portion includes a data channel f-m demodulator 74 tuned to the 100 kHz carrier (channel B) preceded by a 60 Hz rejection filter 75 and selectively transmitting channel B tones to detector 76 that provides a sequence of 40-bit binary number signals that are applied to 40-bit demultiplexer 77 that functions to deliver cost and volume 16-bit codes in parallel form to storage register 78 and prior to display on cost readout display 14 and volume readout display 13, respectively, after decoding by 7 segment decoder 79. The last bit in the sequence functions to load storage register 78 at the completion of each frame.

Figure 5:
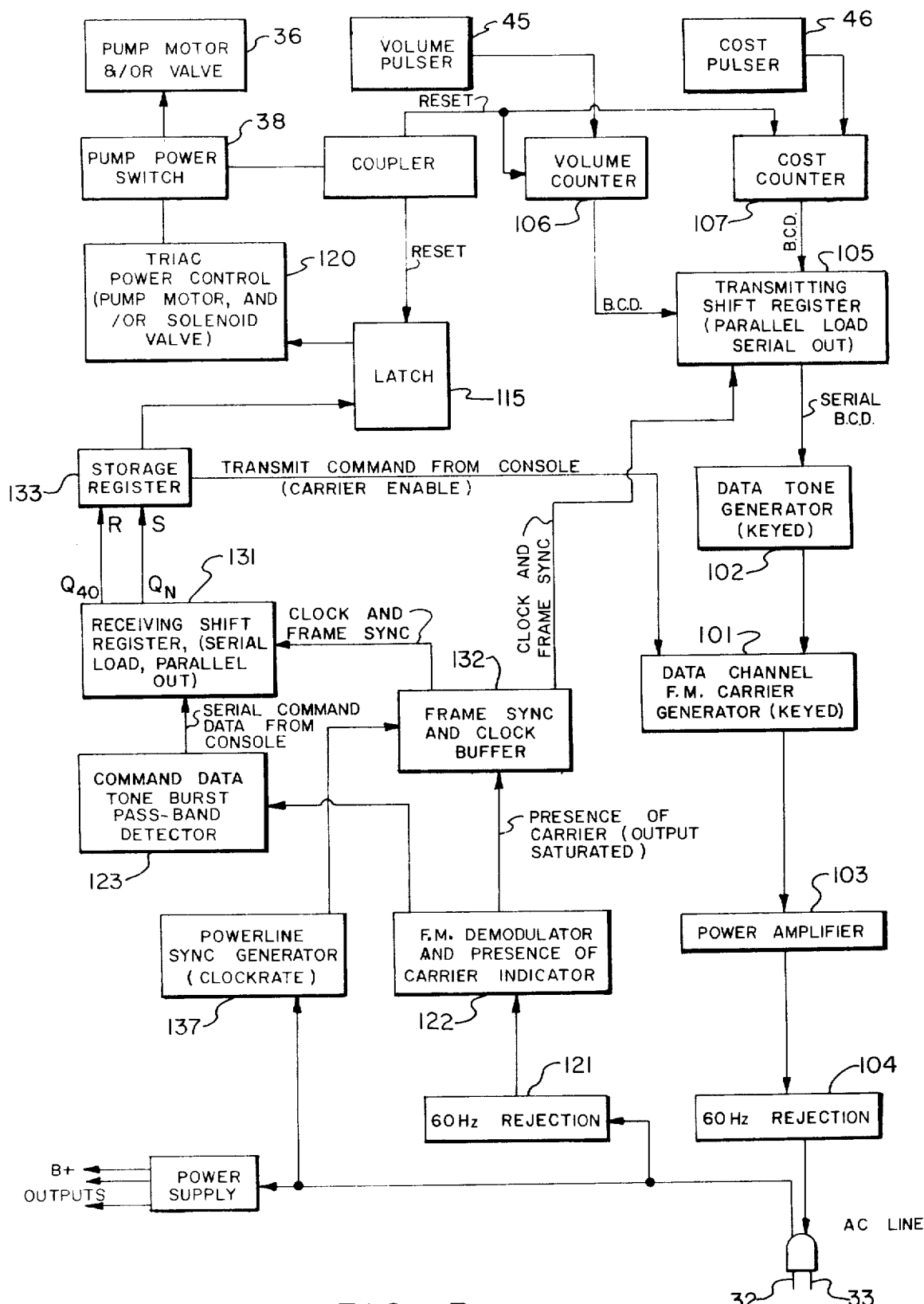
FIG. 5 is a block diagram illustrating the logical arrangement of the system at the central location for controlling and metering the dispensation of fuel at the remote locations.

Referring to FIG. 5, there is shown a block diagram illustrating the logical arrangement of system pump package 31 of FIG. 2 together with certain other elements of the system there illustrated. The system includes a channel B carrier generator 101 that is modulated with a 2 kHz tone from oscillator 102 and provides line driver 103 with the modulated carrier signal, typically 111 kHz for coupling through 60 Hz rejection filter 104 to power lines 33 and 32.

The transmitting portion includes a 40-bit multiplexer or transmitting shift register 105 for enabling oscillator 102 in accordance with BCD number signals coupled from volume and cost counters 106 and 107, respectively, which receive pulses from cost computer-mounted pulsers 45 and 46, respectively.

The carrier generator 101 is enabled only at times assigned for transmission of cost and volume data to the central location in a manner which avoids simultaneous transmission by more than one pump.

The receiving portion of the apparatus includes a 60 Hz rejection filter 121 coupled to demodulator 122 tuned to 50 kHz that provides data tone bursts detected by detector 123. The output of detector 123 is applied to demultiplexer or receiving shift register 131 for enabling the carrier generator when the central station read switch 23 is actuated for the associated pump and for pump power control in the same manner. The demodulator 122 provides clear pulses to multiplexer 105 and demultiplexer 131 at each interruption of the 50 kHz carrier to insure that the pump stations exchange data in synchronism with the data rate at the central station in a manner to be described below.

Clock rate generator 137 is energized by the power line and provides clock pulses to multiplexer 105 and demultiplexer 131 through buffer 132.

Having briefly described the physical arrangement of a system according to the invention, it is appropriate to consider the mode of operation. All data is transmitted by carrier current over the power line on a low radio frequency carrier, typically 100 kHz. This carrier is preferably frequency modulated by an audio tone. The tone is keyed by a telemetry code capable of transmitting up to 38 bits of digital information. The carrier interruption provides a synchronization pulse.

Channel B carries volume and cost information from the pumps to the central station. The channel A tone carries two command signals from the central station for causing power to be applied to the selected pump motors, and for causing the appropriated pump to transmit data. It may also carry intercom control signals for enabling the intercom in a similar manner.

The channel B data is derived from the cost pulser counter 107 and volume pulser counter 106. Pulsers 45 and 46 are mounted on the mechanical computer inside the pump and may comprise a microswitch, magnetic pickup, photoelectric pickup or other suitable means for providing one pulse per tenth of a gallon and one pulse per cent. The counters 106 and 107 accumulate all pulses produced, regardless of the status of the system. A reset signal received from switch 38 resets each counter stage to zero.

The output of each quad of counter stages is a digital signal corresponding to four digits of binarily encoded decimal carried by 16-bit binary words. The outputs of the counter stages are fed into 40-bit multiplexer 105, typically comprising a 40-bit parallel in/serial-out shift register. The shift register comprising multiplexer 105 then cycles through approximately 330 milliseconds to produce a complete volume and cost digital signal transmission in serial form with 32 bits of information. The additional 8-bit capacity facilitates making changes in logic or functions with essentially the same apparatus.

This serial train of digital data signals keys oscillator 102 to produce a tone burst when the output of multiplexer 105 is logical ONE. The keyed audio frequency modulates carrier generator 101 which delivers the modulated carrier to line driver 103, typically a Darlington circuit coupled through a high pass filter 104 to the line.

The information signal is detected by detector 76 in the central station to produce the corresponding train of binary bits at the output of detector 76 fed to the input of demultiplexer 77 that may comprise a shift register which receives the data serially and delivers it in parallel to the storage register 78.

In order to prevent simultaneous data transmission from all control pumps, the channel carrier generator in each pump package is controlled by a command signal on the 50 kHz channel provided by detector 123. Detector 123 drives the input of the 40-bit serial-in-parallel-out shift register 131. The proper input of memory circuit 115 is connected to an appropriate output line designated $Q_N$ of demultiplexer 131. That is to say, pump N has its associated memory circuit 133 input coupled to output $Q_N$ to set the circuit while the circuit is reset in response to a signal from the last output line designated Q40.

Because channel A is arranged to always transmit a logical ONE on the 40th bit for resetting or clocking the latch circuit 115, if for any cycle, the output $Q_N$ goes to logical ZERO, the memory circuit 133 will remain in the reset condition and inhibit the channel A oscillator 101 in the corresponding pump. The first 16 bits of the word transmitted over channel B are used to designate respective ones of the 16 pump stations. The result is that when a particular pump is selected for reading, the memory 133 and latching circuit 115 are set. This energizes triac 120 to close power switch 38. Coupler 119 resets latching circuit 115 and counters 106 and 107 when the pump computer is reset to zero. The remaining bits are used for controlling pump power.

In order to recreate transmitted data correctly, transmitting and receiving shift registers must operate in synchronism. This is accomplished by including clock pulse generators 71 and 137 in central and remote consoles, respectively. All shift registers are clocked by these generators maintained in synchronism with the powerline. These clock pulse or sync generators produce a clock pulse for every line half-cycle, resulting in a constant clock rate over the entire system equal to twice the powerline frequency.

To insure that all the registers are at bit number N at the same time, a synchronoization pulse, or "go-to-zero" command is transmitted once every complete frame. Divide-by-40 counter 73 performs this function by delivering a narrow inhibit pulse to the carrier generator 63 after every 40 clock pulses provided by generator 71. If one or more data samples occur out of phase with the others as might be caused by transient powerline interference, the data samples are forced back into phase within one transmission frame.

There has been described novel apparatus and techniques for controlling and metering the dispensation of liquid with a package that is relatively inexpensive to install in existing stations and may be installed promptly. The system operates reliably. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited soley by the spirit and scope of the appended claims.

What is claimed is:

1. Apparatus for controlling and metering product dispensation comprising, means defining a central console unit at a central location for transmitting to and receiving from a plurality of remote stations at a corresponding plurality of remote locations, means defining a remote station at each remote location, dispensing means having an electric motor energized with electrical energy received over conventional electrical power lines at each of said remote locations having computer means for indicating the amount of material dispensed, said power lines also intercoupling said central and remote stations, a single central location transceiver at said central location and a remote location transceiver at each of said remote locations respectively intercoupled by said power lines, means for converting information provided by said computer means into representative digital data signals characteristic of the amount of material dispensed during the time interval beginning with restoration of said computer means to a predetermined initial condition, means for storing said representative digital data signals at each of said remote locations as the product is being dispensed, means including said transceivers and said power lines for transmitting control signals from said central location to each of said remote locations for enabling and disabling said dispensing means and for initiating reset of said computer means to said predetermined initial condition and the latter means for storing to a corresponding initial condition, means including said transceivers for interrogating each of the remote location storage means and transmitting the stored digital data therein from each of said remote locations to said central location, means at said central location responsive to the transmitted digital data signals for providing a visual display of the amount dispensed at each remote location represented by said transmitted digital data signals, and means for synchronizing the transmission of said digital data signals with the electrical energy of powerline frequency carried by said power lines, said transceivers including sources of radio frequency carriers and means for modulating said carriers with said control signals and said digital data signals for providing modulated carrier signals transmitted over said power lines by transmitter portions of said transceivers and demodulated by receiver portions of said transceivers.

2. Apparatus for controlling and metering product dispensation in accordance with claim 1 further comprising, means for transmitting a synchronizing pulse once for each transmission of a digital number control signal for synchronizing said digital data signals to provide accurate interpretation thereof.

3. Apparatus for controlling and metering product dispensation in accordance with claim 2 and further comprising means for establishing a first group of digits represented by a first portion of each control digital number signal for designating those remote locations activated for dispensing material, means for establishing a second group of digits represented by a second portion of each control digital number signal for designating only a selected one of the activated remote locations for transmission of said transmitted digital data over said power lines at any one time, means at each remote location responsive to a designating control digital number signal first portion for activating the dispensing means thereat, and means at each remote location responsive to a designating control digital number signal second portion for initiating the transmission of said transmitted digital data from that remote location over said power lines to said central station.

4. Apparatus for controlling and metering product dispensation in accordance with claim 3 wherein said means for dispensing comprises a pump having said computer means for producing a pulse for each predetermined incremental amount of material dispensed, and said means for storing comprises counting means responsive to said pulses for storing a count representative of the amount of material dispensed by said pump while said pump is authorized to dispense material for a particular material user, and means for restoring the count in said counting means to a predetermined initial value when said pump is authorized to dispense material for the next user.

5. Apparatus for controlling and metering product dispensation in accordance with claim 4 wherein the frequency of the carrier for carrying said control signals to said remote stations is different from the frequency of the carrier for carrying said transmitted digital data.

6. Apparatus for controlling and metering product dispensation in accordance with claim 4 and further comprising transmitting shift register means at each remote location coupled to said counting means for receiving in parallel digital form said counts representative of the amount of material dispensed by said pump and ejecting said count in serial form for transmission over said power lines to said central location, receiving shift register means at each remote location coupled to the associated remote location transceiver receiver portion for receiving digital control signals in serial form and providing digital control signals as an output in parallel form for controlling said pump, central location transmitting shift register means at said central location for receiving digital said control signals in digital parallel form and ejecting them in serial form for transmission by the transmitter portion of the central location transceiver over said power lines, and central location receiving shift register means at said central location coupled to the receiver portion of the central station transceiver for receiving in serial form the digital signal provided by a remote location transmitting shift register and for providing an output digital signal in parallel form representative of said count that is displayed by said visual display.

* * * * *